US012269674B2

(12) United States Patent
Lucas et al.

(10) Patent No.: US 12,269,674 B2
(45) Date of Patent: *Apr. 8, 2025

(54) MOBILE SUPPORT STRUCTURE FOR BULK MATERIAL CONTAINERS

(71) Applicant: Halliburton Energy Services, Inc., Houston, TX (US)

(72) Inventors: Bryan C. Lucas, Duncan, OK (US); Calvin Lynn Stegemoeller, Duncan, OK (US); Austin Carl Schaffner, Duncan, OK (US); Wesley John Warren, Duncan, OK (US); Bryan John Lewis, Duncan, OK (US); Tori H. Miller, Duncan, OK (US); Thomas Wayne Hawkins, Duncan, OK (US); Glenn Ray Fowler, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/442,864

(22) Filed: Feb. 15, 2024

(65) Prior Publication Data

US 2024/0182237 A1 Jun. 6, 2024

Related U.S. Application Data

(60) Continuation of application No. 16/686,553, filed on Nov. 18, 2019, now Pat. No. 11,939,152, which is a
(Continued)

(51) Int. Cl.
*B65D 90/12* (2006.01)
*B62D 63/06* (2006.01)
(Continued)

(52) U.S. Cl.
CPC ........... *B65D 90/125* (2013.01); *B62D 63/06* (2013.01); *B65D 88/1612* (2013.01);
(Continued)

(58) Field of Classification Search
CPC .................................................. B65D 90/125
See application file for complete search history.

(56) References Cited

U.S. PATENT DOCUMENTS 710,611 A   10/1902  Ray
802,254 A   10/1905  Baker
(Continued)

FOREIGN PATENT DOCUMENTS

EP   2937826 A1   10/2015
GB   2066220 A     7/1981
(Continued)

OTHER PUBLICATIONS

International Preliminary Report on Palatability issued in related PCT Application No. PCTUS2015041543 dated Feb. 1, 2018 (12 pages).

*Primary Examiner* — Mark C Hageman
(74) *Attorney, Agent, or Firm* — Conley Rose, P.C.; Rodney B. Carroll

(57) ABSTRACT

Systems and methods for efficiently managing bulk material are provided. The disclosure is directed to a portable support structure used to receive one or more portable containers of bulk material and output bulk material from the containers directly into the blender hopper. The portable support structure may include a frame for receiving and holding the one or more portable bulk material containers in an elevated position proximate the blender hopper, as well as one or more gravity feed outlets for routing the bulk material from the containers directly into the blender hopper. In some embodiments, the portable support structure may be trans-
(Continued)

ported to the well site on a trailer, unloaded from the trailer, and positioned proximate the blender unit. In other embodiments, the portable support structure may be a mobile support structure that is integrated into a trailer unit.

22 Claims, 4 Drawing Sheets

Related U.S. Application Data division of application No. 15/522,601, filed as application No. PCT/US2015/041543 on Jul. 22, 2015, now Pat. No. 10,526,136.

(51) Int. Cl.
  *B65D 88/16*   (2006.01)
  *B65D 88/26*   (2006.01)
  *B65D 90/20*   (2006.01)
  *B65D 90/48*   (2006.01)
  *B65D 90/66*   (2006.01)

(52) U.S. Cl.
  CPC ............ *B65D 88/26* (2013.01); *B65D 90/20* (2013.01); *B65D 90/48* (2013.01); *B65D 90/66* (2013.01)

(56) References Cited

U.S. PATENT DOCUMENTS

| | | |
|---|---|---|
| 917,646 A | 4/1909 | Newey |
| 1,519,153 A | 12/1924 | Mitton |
| 1,726,603 A | 9/1929 | Wallace |
| 1,795,987 A | 3/1931 | Adams |
| 2,138,172 A * | 11/1938 | Johnson ............... B28C 7/0481 366/50 |
| 2,231,911 A | 2/1941 | Hitt |
| 2,281,497 A | 4/1942 | Hyson |
| 2,385,245 A | 9/1945 | Willoughby |
| 2,415,782 A | 2/1947 | Zademach |
| 2,513,012 A | 6/1950 | Dugas |
| 2,563,470 A | 8/1951 | Kane |
| 2,652,174 A | 9/1953 | West |
| 2,670,866 A | 3/1954 | Glesby |
| 2,678,737 A | 5/1954 | Mangrum |
| 2,703,659 A | 3/1955 | Hutchins |
| 2,756,073 A | 7/1956 | Bridge |
| 2,759,737 A | 8/1956 | Manning |
| 2,802,603 A | 8/1957 | Mccray |
| 2,867,336 A | 1/1959 | Soldini |
| 2,873,036 A | 2/1959 | Noble |
| 3,049,248 A | 8/1962 | Heltzel |
| 3,083,879 A | 4/1963 | Coleman |
| 3,151,779 A | 10/1964 | Rensch |
| 3,203,370 A | 8/1965 | Haug |
| 3,217,927 A | 11/1965 | Bale, Jr. |
| 3,315,826 A | 4/1967 | Gardner |
| 3,318,473 A | 5/1967 | Jones |
| 3,326,572 A | 6/1967 | Murray |
| 3,343,688 A | 9/1967 | Ross |
| 3,354,918 A | 11/1967 | Coleman |
| 3,404,963 A | 10/1968 | Fritsche |
| 3,432,151 A | 3/1969 | O'Loughlin et al. |
| 3,467,408 A | 9/1969 | Regalia |
| 3,476,270 A | 11/1969 | Cox |
| 3,602,400 A | 8/1971 | Cooke |
| 3,627,555 A | 12/1971 | Driscoll |
| 3,698,693 A | 10/1972 | Poncet |
| 3,785,534 A | 1/1974 | Smith |
| 3,802,584 A | 4/1974 | Sackett |
| 3,856,275 A | 12/1974 | Dydzyk |
| 3,986,708 A | 10/1976 | Heltzel |
| 4,023,719 A | 5/1977 | Noyon |
| 4,058,239 A | 11/1977 | Van Mill |
| 4,138,163 A | 2/1979 | Calvert |
| 4,178,117 A | 12/1979 | Brugler |
| 4,204,773 A | 5/1980 | Bates |
| 4,248,337 A | 2/1981 | Zimmer |
| 4,258,953 A | 3/1981 | Johnson |
| 4,313,708 A | 2/1982 | Tiliakos |
| 4,395,052 A | 7/1983 | Rash |
| 4,398,653 A | 8/1983 | Daloisio |
| 4,423,884 A | 1/1984 | Gevers |
| 4,544,279 A | 10/1985 | Rudolph |
| 4,548,507 A | 10/1985 | Mathis |
| 4,583,663 A | 4/1986 | Bonerb |
| 4,626,166 A | 12/1986 | Jolly |
| 4,701,095 A | 10/1987 | Berryman |
| 4,806,065 A | 2/1989 | Holt |
| 4,850,702 A | 7/1989 | Arribau |
| 4,856,681 A | 8/1989 | Murray |
| 4,900,157 A | 2/1990 | Stegemoeller |
| 4,919,540 A | 4/1990 | Stegemoeller |
| 4,953,752 A | 9/1990 | Tousignant |
| 4,956,821 A | 9/1990 | Fenelon |
| 4,993,883 A | 2/1991 | Jones |
| 4,997,335 A | 3/1991 | Prince |
| 5,036,979 A | 8/1991 | Selz |
| 5,096,096 A | 3/1992 | Calaunan |
| 5,114,169 A | 5/1992 | Botkin |
| 5,149,192 A | 9/1992 | Hamm |
| 5,303,998 A | 4/1994 | Whitlatch |
| 5,339,996 A | 8/1994 | Dubbert |
| 5,343,813 A | 9/1994 | Septer |
| 5,375,730 A | 12/1994 | Bahr |
| 5,401,129 A | 3/1995 | Eatinger |
| 5,413,154 A | 5/1995 | Hurst, Jr. |
| 5,415,323 A | 5/1995 | Fenelon |
| 5,426,137 A | 6/1995 | Allen |
| 5,441,321 A | 8/1995 | Karpisek |
| 5,443,350 A | 8/1995 | Wilson |
| 5,445,289 A | 8/1995 | Owen |
| 5,590,976 A | 1/1997 | Kilheffer |
| 5,722,552 A | 3/1998 | Olson |
| 5,772,390 A | 6/1998 | Walker |
| 5,806,441 A | 9/1998 | Chung |
| 5,913,459 A | 6/1999 | Gill |
| 5,915,913 A | 6/1999 | Greenlaw |
| 5,927,356 A | 7/1999 | Henderson |
| 5,944,470 A | 8/1999 | Bonerb |
| 5,971,600 A | 10/1999 | Paterson |
| 5,997,099 A | 12/1999 | Collins |
| 6,059,372 A | 5/2000 | McDonald |
| 6,112,946 A | 9/2000 | Bennett |
| 6,126,307 A | 10/2000 | Black |
| 6,193,402 B1 | 2/2001 | Grimland |
| 6,247,594 B1 | 6/2001 | Garton |
| 6,379,086 B1 | 4/2002 | Goth |
| 6,425,627 B1 | 7/2002 | Gee |
| 6,491,421 B2 | 12/2002 | Rondeau |
| 6,517,232 B1 | 2/2003 | Blue |
| 6,536,939 B1 | 3/2003 | Blue |
| 6,537,015 B2 | 3/2003 | Lim |
| 6,568,567 B2 | 5/2003 | McKenzie |
| 6,622,849 B1 | 9/2003 | Sperling |
| 6,655,548 B2 | 12/2003 | McClure, Jr. |
| 6,876,904 B2 | 4/2005 | Oberg |
| 6,980,914 B2 | 12/2005 | Bivens |
| 7,008,163 B2 | 3/2006 | Russell |
| 7,086,342 B2 | 8/2006 | O'Neall |
| 7,100,896 B1 | 9/2006 | Cox |
| 7,114,905 B2 | 10/2006 | Dibdin |
| 7,252,309 B2 | 8/2007 | Eng Soon |
| 7,284,579 B2 | 10/2007 | Elgan |
| 7,351,025 B2 | 4/2008 | Galijan |
| 7,451,015 B2 | 11/2008 | Mazur |
| 7,475,796 B2 | 1/2009 | Garton |
| 7,500,817 B2 | 3/2009 | Furrer |
| 7,513,280 B2 * | 4/2009 | Brashears ............ B65D 88/28 141/94 |
| 7,665,788 B2 | 2/2010 | Dibdin |
| 7,762,281 B2 | 7/2010 | Schuld |
| 7,997,213 B1 | 8/2011 | Gauthier |

(56) References Cited

U.S. PATENT DOCUMENTS

| | | |
|---|---|---|
| 8,387,824 B2 | 3/2013 | Wietgrefe |
| 8,434,990 B2 | 5/2013 | Claussen |
| D688,349 S | 8/2013 | Oren |
| D688,350 S | 8/2013 | Oren |
| D688,351 S | 8/2013 | Oren |
| D688,772 S | 8/2013 | Oren |
| 8,505,780 B2 | 8/2013 | Oren |
| 8,545,148 B2 | 10/2013 | Wanek-Pusset |
| 8,573,917 B2 | 11/2013 | Renyer |
| 8,585,341 B1 | 11/2013 | Oren |
| 8,607,289 B2 | 12/2013 | Brown |
| 8,616,370 B2 | 12/2013 | Allegretti |
| 8,622,251 B2 | 1/2014 | Oren |
| 8,662,525 B1 | 3/2014 | Dierks |
| 8,668,430 B2 | 3/2014 | Oren |
| D703,582 S | 4/2014 | Oren |
| 8,827,118 B2 | 9/2014 | Oren |
| 8,834,012 B2 | 9/2014 | Case |
| 8,887,914 B2 | 11/2014 | Allegretti |
| RE45,713 E | 10/2015 | Oren |
| 9,162,603 B2 | 10/2015 | Oren |
| RE45,788 E | 11/2015 | Oren |
| 9,248,772 B2 | 2/2016 | Oren |
| RE45,914 E | 3/2016 | Oren |
| 9,296,518 B2 | 3/2016 | Oren |
| 9,322,138 B2 | 4/2016 | Villalobos Davila |
| 9,340,353 B2 | 5/2016 | Oren |
| 9,358,916 B2 | 6/2016 | Oren |
| 9,394,102 B2 | 7/2016 | Oren |
| 9,403,626 B2 | 8/2016 | Oren |
| 9,421,899 B2 | 8/2016 | Oren |
| 9,440,785 B2 | 9/2016 | Oren |
| 9,446,801 B1 | 9/2016 | Oren |
| 9,475,661 B2 | 10/2016 | Oren |
| 9,511,929 B2 | 12/2016 | Oren |
| 9,522,816 B2 | 12/2016 | Taylor |
| 9,527,664 B2 | 12/2016 | Oren |
| 9,580,238 B2 | 2/2017 | Friesen |
| RE46,334 E | 3/2017 | Oren |
| 9,617,065 B2 | 4/2017 | Allegretti |
| 9,617,066 B2 | 4/2017 | Oren |
| 9,624,030 B2 | 4/2017 | Oren |
| 9,624,036 B2 | 4/2017 | Luharuka |
| 9,643,774 B2 | 5/2017 | Oren |
| 9,650,216 B2 | 5/2017 | Allegretti |
| 9,656,799 B2 | 5/2017 | Oren |
| 9,669,993 B2 | 6/2017 | Oren |
| 9,670,752 B2 | 6/2017 | Glynn |
| 9,676,554 B2 | 6/2017 | Glynn |
| 9,682,815 B2 | 6/2017 | Oren |
| 9,694,970 B2 | 7/2017 | Oren |
| 9,701,463 B2 | 7/2017 | Oren |
| 9,718,609 B2 | 8/2017 | Oren |
| 9,718,610 B2 | 8/2017 | Oren |
| 9,725,233 B2 * | 8/2017 | Oren .................... B65D 90/587 |
| 9,725,234 B2 | 8/2017 | Oren |
| 9,738,439 B2 | 8/2017 | Oren |
| RE46,531 E | 9/2017 | Oren |
| 9,758,081 B2 | 9/2017 | Oren |
| 9,758,082 B2 * | 9/2017 | Eiden, III .............. B65G 65/42 |
| 9,758,993 B1 | 9/2017 | Allegretti |
| 9,771,224 B2 | 9/2017 | Oren |
| 9,783,338 B1 | 10/2017 | Allegretti |
| 9,796,319 B1 | 10/2017 | Oren |
| 9,796,504 B1 | 10/2017 | Allegretti |
| 9,809,381 B2 | 11/2017 | Oren |
| 9,828,135 B2 | 11/2017 | Allegretti |
| 9,840,366 B2 | 12/2017 | Oren |
| 9,969,564 B2 | 5/2018 | Oren |
| 9,988,182 B2 | 6/2018 | Allegretti |
| 10,059,246 B1 | 8/2018 | Oren |
| 10,081,993 B2 | 9/2018 | Walker |
| 10,150,612 B2 * | 12/2018 | Pham .................... B65D 90/48 |
| 10,189,599 B2 | 1/2019 | Allegretti |
| 10,207,753 B2 | 2/2019 | Marra |
| 10,287,091 B2 | 5/2019 | Allegretti |
| 10,308,421 B2 | 6/2019 | Allegretti |
| 10,486,854 B2 | 11/2019 | Allegretti |
| 10,518,828 B2 | 12/2019 | Oren |
| 10,526,136 B2 | 1/2020 | Hawkins et al. |
| 10,604,338 B2 | 3/2020 | Allegretti |
| 10,994,954 B2 * | 5/2021 | Allegretti ............... G01G 19/52 |
| 11,661,291 B2 * | 5/2023 | Shepherd ............ B65G 65/005 |
| | | 414/288 |
| 11,814,242 B2 | 11/2023 | Hawkins et al. |
| 11,939,152 B2 | 3/2024 | Hawkins et al. |
| 2002/0121464 A1 | 9/2002 | Soldwish-Zoole |
| 2003/0159310 A1 | 8/2003 | Hensley |
| 2004/0008571 A1 | 1/2004 | Coody |
| 2004/0031335 A1 | 2/2004 | Fromme |
| 2004/0206646 A1 | 10/2004 | Goh |
| 2004/0258508 A1 | 12/2004 | Jewell |
| 2005/0219941 A1 | 10/2005 | Christenson |
| 2006/0013061 A1 | 1/2006 | Bivens |
| 2007/0014185 A1 | 1/2007 | Diosse |
| 2007/0201305 A1 | 8/2007 | Heilman |
| 2008/0187423 A1 | 8/2008 | Mauchle |
| 2008/0294484 A1 | 11/2008 | Furman |
| 2009/0078410 A1 | 3/2009 | Krenek |
| 2009/0129903 A1 | 5/2009 | Lyons, III |
| 2009/0292572 A1 | 11/2009 | Alden |
| 2009/0314791 A1 | 12/2009 | Hartley |
| 2010/0319921 A1 | 12/2010 | Eia |
| 2011/0272155 A1 | 11/2011 | Warren |
| 2012/0017812 A1 | 1/2012 | Renyer |
| 2012/0018093 A1 | 1/2012 | Zuniga |
| 2012/0037231 A1 | 2/2012 | Janson |
| 2012/0181093 A1 | 7/2012 | Fehr |
| 2012/0219391 A1 | 8/2012 | Teichrob |
| 2013/0135958 A1 | 5/2013 | O'Callaghan |
| 2013/0142601 A1 | 6/2013 | McIver |
| 2013/0206415 A1 | 8/2013 | Sheesley |
| 2013/0284729 A1 | 10/2013 | Cook |
| 2014/0023463 A1 | 1/2014 | Oren |
| 2014/0023464 A1 | 1/2014 | Oren |
| 2014/0044508 A1 * | 2/2014 | Luharuka ................ E04H 7/22 |
| | | 414/293 |
| 2014/0083554 A1 | 3/2014 | Harris |
| 2014/0216736 A1 | 8/2014 | Leugemors |
| 2014/0299226 A1 | 10/2014 | Oren |
| 2014/0305769 A1 | 10/2014 | Eiden, III |
| 2014/0377042 A1 | 12/2014 | McMahon |
| 2015/0003943 A1 | 1/2015 | Oren |
| 2015/0003955 A1 | 1/2015 | Oren |
| 2015/0016209 A1 | 1/2015 | Barton |
| 2015/0183578 A9 | 7/2015 | Oren |
| 2015/0191318 A1 | 7/2015 | Martel |
| 2015/0284194 A1 | 10/2015 | Oren |
| 2015/0353293 A1 | 12/2015 | Richard |
| 2015/0366405 A1 | 12/2015 | Manchuliantsau |
| 2015/0368052 A1 | 12/2015 | Sheesley |
| 2015/0375930 A1 | 12/2015 | Oren |
| 2016/0031658 A1 | 2/2016 | Oren |
| 2016/0039433 A1 | 2/2016 | Oren |
| 2016/0046438 A1 | 2/2016 | Oren |
| 2016/0046454 A1 | 2/2016 | Oren |
| 2016/0068342 A1 | 3/2016 | Oren |
| 2016/0096154 A1 | 4/2016 | Hideaki Kuada |
| 2016/0130095 A1 | 5/2016 | Oren |
| 2016/0244279 A1 | 8/2016 | Oren |
| 2016/0264352 A1 | 9/2016 | Oren |
| 2016/0332809 A1 | 11/2016 | Harris |
| 2016/0332811 A1 | 11/2016 | Harris |
| 2017/0021318 A1 | 1/2017 | McIver |
| 2017/0129696 A1 | 5/2017 | Oren |
| 2017/0144834 A1 | 5/2017 | Oren |
| 2017/0203915 A1 | 7/2017 | Oren |
| 2017/0217353 A1 | 8/2017 | Vander Pol |
| 2017/0217671 A1 | 8/2017 | Allegretti |
| 2017/0225883 A1 | 8/2017 | Oren |
| 2017/0240350 A1 | 8/2017 | Oren |
| 2017/0240361 A1 | 8/2017 | Glynn |
| 2017/0240363 A1 | 8/2017 | Oren |
| 2017/0267151 A1 | 9/2017 | Oren |

(56) References Cited

U.S. PATENT DOCUMENTS

| | | |
|---|---|---|
| 2017/0283165 A1 | 10/2017 | Oren |
| 2017/0291760 A1* | 10/2017 | Oren .................... B65D 88/129 |
| 2017/0313497 A1 | 11/2017 | Schaffner |
| 2017/0327326 A1 | 11/2017 | Lucas |
| 2017/0349226 A1 | 12/2017 | Oren |
| 2018/0028992 A1 | 2/2018 | Stegemoeller |
| 2018/0257814 A1 | 9/2018 | Allegretti |
| 2019/0009231 A1 | 1/2019 | Warren |
| 2019/0111401 A1 | 4/2019 | Lucas |
| 2020/0062448 A1 | 2/2020 | Allegretti |
| 2024/0182238 A1 | 11/2024 | Lucas et al. |

FOREIGN PATENT DOCUMENTS

| | | |
|---|---|---|
| GB | 2204847 A | 11/1988 |
| JP | 2008239019 A | 10/2008 |
| KR | 20120006262 U | 9/2012 |
| WO | 2008012513 A2 | 1/2008 |
| WO | 2013095871 A1 | 6/2013 |
| WO | 2013142421 A1 | 9/2013 |
| WO | 2014018129 A1 | 1/2014 |
| WO | 2014018236 A2 | 1/2014 |
| WO | 2015119799 A1 | 8/2015 |
| WO | 2015191150 A1 | 12/2015 |
| WO | 2015192061 A1 | 12/2015 |
| WO | 2016044012 A1 | 3/2016 |
| WO | 2016160067 A1 | 10/2016 |

* cited by examiner

MOBILE SUPPORT STRUCTURE FOR BULK MATERIAL CONTAINERS

CROSS REFERENCE TO RELATED APPLICATIONS

The present application is a continuation of U.S. patent application Ser. No. 16/686,553 filed Nov. 18, 2019 and published as U.S. Patent Application Publication No. 2020/0079584 A1, which is a divisional of U.S. patent application Ser. No. 15/522,601 filed Apr. 27, 2017, now U.S. Pat. No. 10,526,136, which is a U.S. National Stage Application of International Application No. PCT/US2015/041543 filed Jul. 22, 2015, all of which are incorporated herein by reference in their entirety for all purposes.

TECHNICAL FIELD

The present disclosure relates generally to transferring dry bulk materials, and more particularly, to a portable support structure for receiving containers of bulk material and routing bulk material from the containers.

BACKGROUND

During the drilling and completion of oil and gas wells, various wellbore treating fluids are used for a number of purposes. For example, high viscosity gels are used to create fractures in oil and gas bearing formations to increase production. High viscosity and high density gels are also used to maintain positive hydrostatic pressure in the well while limiting flow of well fluids into earth formations during installation of completion equipment. High viscosity fluids are used to flow sand into wells during gravel packing operations. The high viscosity fluids are normally produced by mixing dry powder and/or granular materials and agents with water at the well site as they are needed for the particular treatment. Systems for metering and mixing the various materials are normally portable, e.g., skid- or truck-mounted, since they are needed for only short periods of time at a well site.

The powder or granular treating material is normally transported to a well site in a commercial or common carrier tank truck. Once the tank truck and mixing system are at the well site, the dry powder material (bulk material) must be transferred or conveyed from the tank truck into a supply tank for metering into a blender as needed. The bulk material is usually transferred from the tank truck pneumatically. More specifically, the bulk material is blown pneumatically from the tank truck into an on-location storage/delivery system (e.g., silo). The storage/delivery system may then deliver the bulk material onto a conveyor or into a hopper, which meters the bulk material through a chute into a blender tub.

Recent developments in bulk material handling operations involve the use of portable containers for transporting dry material about a well location. The containers can be brought in on trucks, unloaded, stored on location, and manipulated about the well site when the material is needed. The containers are generally easier to manipulate on location than a large supply tank trailer. The containers are eventually emptied by dumping the contents thereof onto a mechanical conveying system (e.g., conveyor belt, auger, bucket lift, etc.). The conveying system then moves the bulk material in a metered fashion to a desired destination at the well site.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
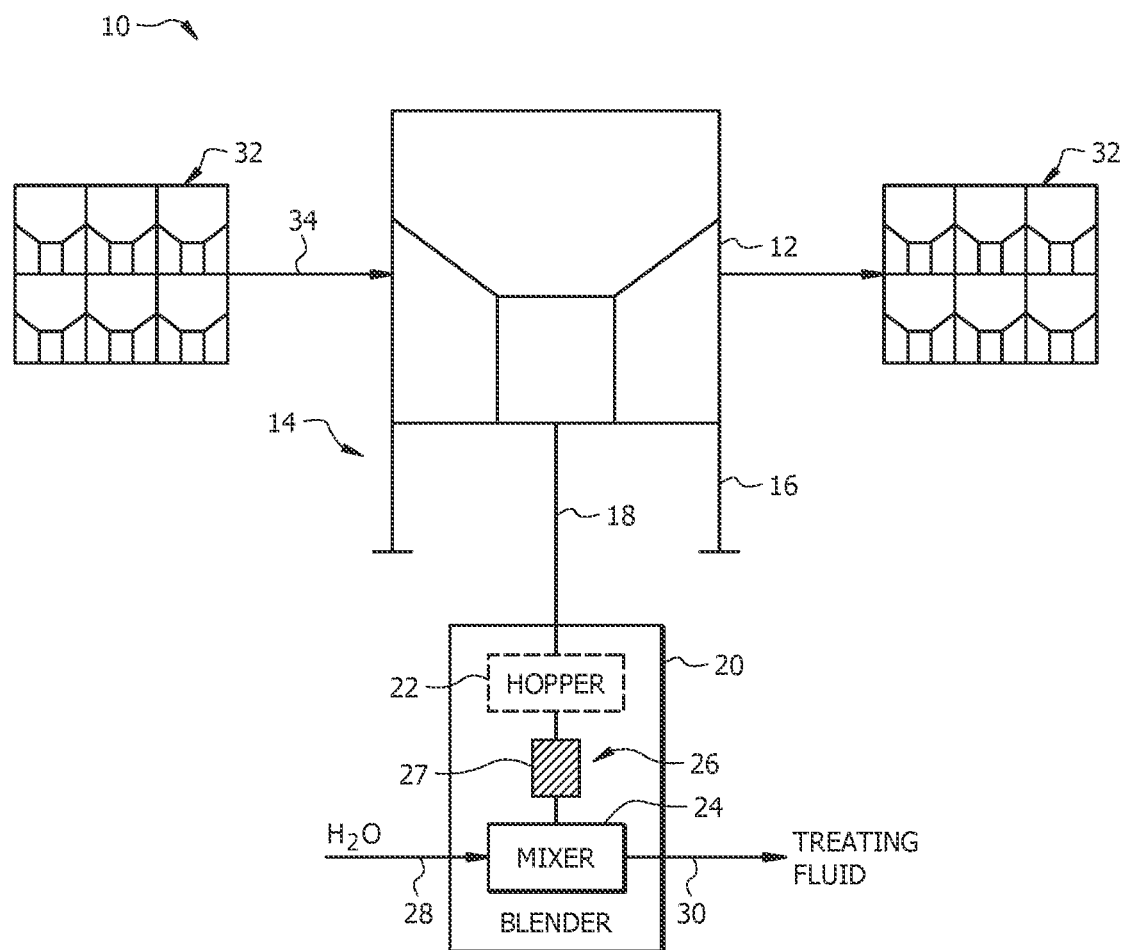
FIG. 1 is a schematic block diagram of a bulk material handling system suitable for releasing bulk material from a container disposed on a portable support structure, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments according to the present disclosure may be directed to systems and methods for efficiently managing bulk material (e.g., bulk solid or liquid material). Bulk material handling systems are used in a wide variety of contexts including, but not limited to, drilling and completion of oil and gas wells, concrete mixing applications, agriculture, and others. The disclosed embodiments are directed to systems and methods for efficiently moving bulk material into a blender inlet of a blender unit at a job site. The systems may include a portable support structure used to receive one or more portable containers of bulk material and output bulk material from the containers directly into the blender inlet. The disclosed techniques may be used to efficiently handle any desirable bulk material having a solid or liquid constituency including, but not limited to, sand, proppant, gel particulate, diverting agent, dry-gel particulate, liquid additives and others.

In currently existing on-site bulk material handling applications, dry material (e.g., sand, proppant, gel particulate, or dry-gel particulate) may be used during the formation of treatment fluids. In such applications, the bulk material is often transferred between transportation units, storage tanks, blenders, and other on-site components via pneumatic transfer, sand screws, chutes, conveyor belts, and other components. Recently, a new method for transferring bulk material to a hydraulic fracturing site involves using portable containers to transport the bulk material. The containers can be brought in on trucks, unloaded, stored on location, and manipulated about the site when the material is needed. These containers generally include a discharge gate at the bottom that can be actuated to empty the material contents of the container at a desired time.

In existing systems, the containers are generally supported above a mechanical conveying system (e.g., moving belt, auger, bucket lift, etc.) prior to releasing the bulk material. The discharge gates on the containers are opened to release the bulk material via gravity onto the moving mechanical conveying system. The mechanical conveying system then directs the dispensed bulk material toward a desired destination, such as a hopper on a blender unit. Unfortunately, this process can release a relatively large amount of dust into the air and result in unintended material spillage. In addition, the mechanical conveying system is generally run on auxiliary power and, therefore, requires an external power source to feed the bulk material from the containers to the blender.

The material handling systems having the portable support structure disclosed herein are designed to address and eliminate the shortcomings associated with existing container handling systems. The portable support structure may include a frame for receiving and holding one or more portable bulk material containers in an elevated position proximate the blender inlet (e.g., blender hopper or mixer inlet), as well as one or more gravity feed outlets for routing the bulk material from the containers directly into the blender inlet. In some embodiments, the portable support structure may be transported to the well site on a trailer, unloaded from the trailer, and positioned proximate the blender unit. In other embodiments, the portable support structure may be a mobile support structure that is integrated into a trailer unit. The portable support structure may be designed with an open space at one side so that the blender unit can be backed up until the blender inlet is in position directly under the gravity feed outlet(s) of the support structure.

The disclosed portable support structure may provide an elevated location for one or more bulk material containers to be placed while the proppant (or any other liquid or solid bulk material used in the fluid mixtures at the job site) is transferred from the containers to the blender. The support structure may elevate the bulk material containers to a sufficient height above the blender inlet and route the bulk material directly from the containers to the blender inlet. This may eliminate the need for any subsequent pneumatic or mechanical conveyance of the bulk material (e.g., via a separate mechanical conveying system) from the containers to the blender. This may improve the energy efficiency of bulk material handling operations at a job site, since no auxiliary power sources are needed to move the material from the containers into the blender inlet. In addition, the portable support structure may simplify the operation of transferring bulk material, reduce material spillage, and decrease dust generation.

Turning now to the drawings, FIG. 1 is a block diagram of a bulk material handling system 10. The system 10 includes a container 12 elevated on a portable support structure 14 and holding a quantity of bulk material (e.g., solid or liquid treating material). The portable support structure 14 may include a frame 16 for receiving and holding the container 12 and a gravity feed outlet 18 for directing bulk material away from the container 12. The outlet 18 may be coupled to and extending from the frame 16. The outlet 18 may utilize a gravity feed to provide a controlled, i.e. metered, flow of bulk material from the container 12 to a blender unit 20.

As illustrated, the blender unit 20 may include a hopper 22 and a mixer 24 (e.g., mixing compartment). The blender unit 20 may also include a metering mechanism 26 for providing a controlled, i.e. metered, flow of bulk material from the hopper 22 to the mixer 24. However, in other embodiments the blender unit 20 may not include the hopper 22, such that the outlet 18 of the support structure 14 may provide bulk material directly into the mixer 20.

Water and other additives may be supplied to the mixer 24 (e.g., mixing compartment) through a fluid inlet 28. As those of ordinary skill in the art will appreciate, the fluid inlet 28 may comprise more than the one input flow line illustrated in FIG. 1. The bulk material and water may be mixed in the mixer 24 to produce (at an outlet 30) a fracing fluid, a mixture combining multiple types of proppant, proppant/dry-gel particulate mixture, sand/sand-diverting agents mixture, cement slurry, drilling mud, a mortar or concrete mixture, or any other fluid mixture for use on location. The outlet 30 may be coupled to a pump for conveying the treating fluid to a desired location (e.g., a hydrocarbon recovery well) for a treating process. It should be noted that the disclosed system 10 may be used in other contexts as well. For example, the bulk material handling system 10 may be used in concrete mixing operations (e.g., at a construction site) to dispense aggregate from the container 18 through the outlet 22 into a concrete mixing apparatus (mixer 16). In addition, the bulk material handling system 10 may be used in agriculture applications to dispense grain, feed, seed, or mixtures of the same.

It should be noted that the disclosed container 12 may be utilized to provide bulk material for use in a variety of treating processes. For example, the disclosed systems and methods may be utilized to provide proppant materials into fracture treatments performed on a hydrocarbon recovery well. In other embodiments, the disclosed techniques may be used to provide other materials (e.g., non-proppant) for diversions, conductor-frac applications, cement mixing, drilling mud mixing, and other fluid mixing applications.

As illustrated, the container 12 may be elevated above an outlet location via the frame 16. The support structure 14 is designed to elevate the container 12 above the level of the blender inlet (e.g., blender hopper 22 and/or mixing tub 24) to allow the bulk material to gravity feed from the container 12 to the blender unit 20. This way, the container 12 is able to sit on the frame 16 of the support structure 14 and output bulk material directly into the blender unit 20 via the gravity feed outlet 18 of the support structure 14.

Although shown as supporting a single container 12, other embodiments of the frame 16 may be configured to support multiple containers 12. The exact number of containers 12 that the support structure 14 can hold may depend on a combination of factors such as, for example, the volume, width, and weight of the containers 12 to be disposed thereon.

In any case, the container(s) 12 may be completely separable and transportable from the frame 16, such that any container 12 may be selectively removed from the frame 16 and replaced with another container 12. That way, once the bulk material from the container 12 runs low or empties, a new container 12 may be placed on the frame 16 to maintain a steady flow of bulk material to an outlet location. In some instances, the container 12 may be closed before being completely emptied, removed from the frame 16, and replaced by a container 12 holding a different type of bulk material to be provided to the outlet location.

A portable bulk storage system 32 may be provided at the site for storing one or more additional containers 12 of bulk material to be positioned on the frame 16 of the support structure 14. The bulk material containers 12 may be transported to the desired location on a transportation unit (e.g., truck). The bulk storage system 32 may be the transportation unit itself or may be a skid, a pallet, or some other holding area. One or more containers 12 of bulk material may be transferred from the storage system 32 onto the support structure 14, as indicated by arrow 34. This transfer may be performed by lifting the container 12 via a hoisting mechanism, such as a forklift, a crane, or a specially designed container management device.

When the one or more containers 12 are positioned on the support structure 14, discharge gates on one or more of the containers 12 may be opened, allowing bulk material to flow from the containers 12 into the outlet 18 of the support structure 14. The outlet 18 may then route the flow of bulk material directly into a blender inlet (e.g., into the hopper 22 or mixer 24) of the blender unit 20.

After one or more of the containers 12 on the support structure 14 are emptied, the empty container(s) 12 may be removed from the support structure 14 via a hoisting mechanism. In some embodiments, the one or more empty containers 12 may be positioned on another bulk storage system 32 (e.g., a transportation unit, a skid, a pallet, or some other holding area) until they can be removed from the site and/or refilled. In other embodiments, the one or more empty containers 12 may be positioned directly onto a transportation unit for transporting the empty containers 12 away from the site. It should be noted that the same transportation unit used to provide one or more filled containers 12 to the location may then be utilized to remove one or more empty containers 12 from the site.

Figure 2:
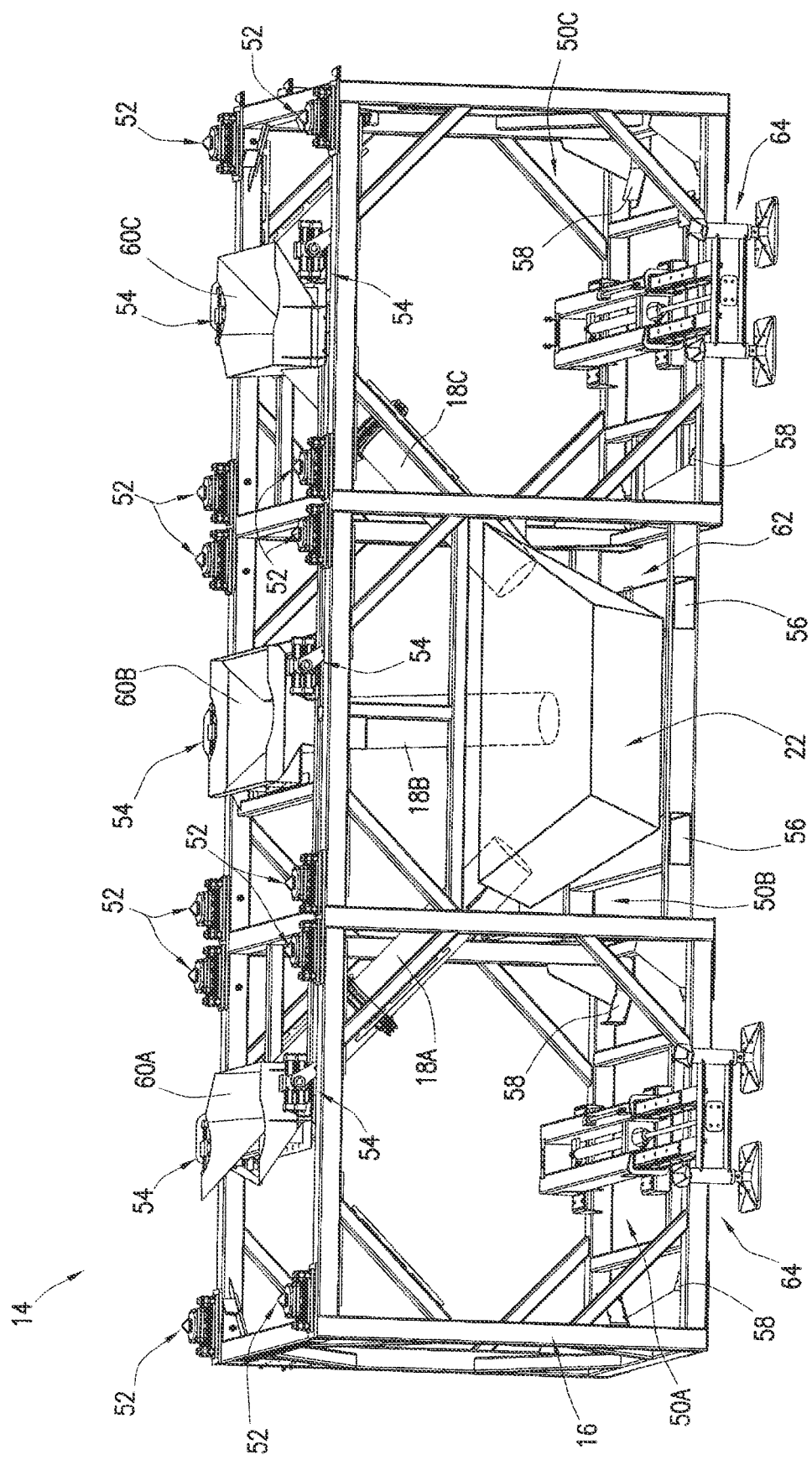
FIG. 2 is a perspective view of a portable support structure used to route bulk material into a blender inlet, in accordance with an embodiment of the present disclosure.

FIG. 2 illustrates an embodiment of the support structure 14 that may be designed to receive multiple containers. Specifically, the support structure 14 includes a frame 16 sized to receive and support up to three portable containers. The frame 16 may include several beams connected together (e.g., via welds, rivets or bolts) to form a continuous group of cubic or rectangular shaped supports 50 coupled end to end. For example, in the illustrated embodiment the frame 16 generally includes one continuous, elongated rectangular body broken into three distinct cubic/rectangular supports 50A, 50B, and 50C. Each cubic/rectangular support 50 may be used to support a single container. The frame 16 may include additional beams that function as trusses to help support the weight of the filled containers disposed on the frame 16. Other shapes, layouts, and constructions of the frame 16 may be used in other embodiments. In addition, other embodiments of the support structure 14 may include a frame 16 sized to receive other numbers (e.g., 1, 2, 4, 5, 6, 7, or more) portable containers.

As illustrated, the support structure 14 may be equipped with a plurality of locator pins 52 disposed on top of the frame 16 for locating and holding the containers on the frame 16. The containers may include complementary engagement features designed to interface with the locator pins 52, thus enabling a precise placement of the containers into desired locations on the frame 16. In the illustrated embodiment, the locator pins 52 are generally disposed at the corners on the upper face of each cubic/rectangular support 50. However, other placements of the locator pins 52 along the upper surface of the support structure 16 may be utilized in other embodiments.

The support structure 14 may also include one or more actuators 54 designed to aid in actuation of a discharge gate of the one or more containers disposed on the frame 16. In the illustrated embodiment, the actuators 54 may be rotary actuators designed to rotate into engagement with a discharge gate of a container to transition the gate between a closed position and an open position. In other embodiments, the actuators 54 may be linear actuators designed to interface with the gates of the containers to selectively open and close the gates. In some embodiments, the actuators 54 may include a set of two actuators (disposed on opposite sides of the frame 16) for actuating the discharge gate of a single container disposed on the frame 16. In such an arrangement, one of the actuators 54 may transition the gate from closed to open, while the opposite actuator 54 may transition the gate from open to closed.

The illustrated support structure 14 may be transportable to and from a desired location on a flatbed trailer or some other transportation unit. Once at location, a hoisting mechanism (e.g., forklift, crane, etc.) may be used to remove the support structure 14 from the transportation system unit and to place the support structure 14 into a desired position. To that end, the support structure may include slots 56 that a forklift can engage to lift and manipulate the portable support structure 14 about the site. In the illustrated embodiment, the slots 56 are formed in a section of the frame 16 that is slightly elevated above a lower edge of the support structure 14. This may enable relatively easy release of the forklift from the support structure 14 once the structure 14 is positioned on the ground. The slots 56 may be formed through a central portion (e.g., central cubic/rectangular support 50B) of the elongated support structure 14 to keep the weight of the support structure evenly distributed during its movement at the site. In other embodiments, the support structure 14 may include other types of mechanical features for interfacing with another type of hoisting mechanism. For example, the support structure 14 may include one or more lifting eyes (not shown) for interfacing with a crane used to position the support structure 14 as needed at the site.

Once the forklift (or other hoisting mechanism) brings the support structure 14 to a desired location at the site, the hoisting mechanism may lower the support structure 14 onto the ground or a relatively flat loading area proximate the ground level. The frame may 16 include corner supports 58 for distributing a weight of the support structure 14 (and any containers disposed thereon) along the ground surface. As shown, the corner supports 58 may be disposed along the lower surface of the frame 16 at various corners of the cubic/rectangular supports 50. In the illustrated embodiment, for example, the corner supports 58 may be disposed at the lower corners of the two outside cubic/rectangular supports 50A and 50C, since the lower surface of the central support 50B is slightly elevated above the ground level.

As described above, the support structure 14 may include several gravity feed outlets 18 for routing bulk material directly from one or more containers disposed on the frame 16 into a blender inlet. The term "blender inlet" used herein may refer to any number of inlets to tubs, hoppers, mixers, and other areas where bulk material is needed. As mentioned above, the blender inlet may be associated with a blender disposed at a job site (e.g., at a well site). For example, the blender inlet may be a blender hopper (e.g., hopper 22 of FIG. 1) used to provide bulk material to a metering system that meters the bulk material into a mixer. In other embodiments, the blender inlet may be an inlet directly into a mixing vessel (e.g., mixer 24 of FIG. 1) of a blender. In such instances, the mixing vessel may be configured such that it is sitting directly on the ground, instead of in an elevated position within the blender. This may enable the containers to dump bulk material directly into the mixer, without the containers being elevated exceedingly high. In still other embodiments, the blender inlet may be a mixer feeder (e.g., conveyor, sand screw, or the metering mechanism 26 of FIG. 1). Other embodiments may utilize other types of blender inlets for receiving the bulk material from the containers disposed on the support structure 14.

In the illustrated embodiment, the blender unit 20 and support structure 14 may be designed such that the support structure 14 is used to route bulk material directly from containers into the blender hopper 22. That is, the "blender inlet" in this embodiment may correspond to the blender hopper 22. In FIG. 2, the blender hopper 22 is shown schematically without showing the rest of the blender unit (e.g., mixing compartment, sand screws for transporting bulk material from the hopper 22 to the mixer, etc.). Again, it should be noted that other embodiments of the blender may feature other types of blender inlets into which the gravity feed outlets 18 are designed to route bulk material from one or more containers.

The gravity feed outlets 18A, 18B, and 18C may be used to deliver a flow of bulk material to the blender hopper 22 (or other blender inlet) from each of three respective containers disposed on the frame 16. In some embodiments, the support structure 14 may also include individual hoppers 60A, 60B, and 60C at the top of the frame 16 for funneling bulk material from the discharge gate of the corresponding containers into the gravity feed outlets 18A, 18B, and 18C, respectively.

The gravity feed outlets 18A, 18B, and 18C may be chutes positioned so that the upper end of each chute is disposed beneath a discharge gate of a corresponding container (or one of the hoppers 60) on the frame 16. The gravity feed outlets 18 may be positioned such that the lower end of each chute is disposed fully within the blender hopper 22. This allows the gravity feed outlets 18 to provide bulk material from all of the containers positioned on the frame 16 into the same blender inlet (e.g., blender hopper 22) at the same time. The outlets 18 are able to provide a gravity feed where an angle of repose of the bulk material exiting the chutes is able to choke the flow of bulk material through the chutes. As bulk material is metered from the blender hopper 22 into another portion of the blender (e.g., mixer), additional bulk material is able to flow via gravity into the hopper 22 directly from the one or more outlets 18. In embodiments where the gravity feed outlets 18 are positioned to route bulk material directly from the containers into an inlet of the mixer of the blender unit, the outlets 18 and/or the blender inlet may feature a metering gate/valve used to regulate the amount of bulk material provided into the mixer (e.g., instead of separate sand screws)

The disclosed gravity feed outlets 18 provide a more controlled output of bulk material to the blender inlet (e.g., blender hopper 22) than would be available through the use of mechanical conveying systems to drop bulk material into the hopper. In addition, the choke feed of bulk material through the outlets 18 and into the blender inlet may reduce an amount of dust generated at a well site, as compared to existing pneumatic or mechanical conveying systems. Further, the gravity feed outlets 18 are able to route the bulk material directly into the blender inlet from the containers without the use of pneumatic or mechanical conveyance equipment operating on auxiliary power. This makes the process of moving the bulk material more efficient than would be possible using a separate pneumatic or mechanical conveyor between the containers and the blender.

It may be desirable for the outlets 18 to be angled by a certain amount so that the lower ends of the outlets 18 interface directly with the blender hopper 22. In some embodiments, the angle of inclination of each gravity feed outlet 18 from a horizontal plane may be between approximately 25 and 55 degrees, between approximately 30 and 50 degrees, between approximately 35 and 45 degrees, or equal to approximately 40 degrees. As shown, it may be desirable to angle the outlets 18 such that outlets 18 direct the bulk material toward a central collection point proximate a center portion (e.g., support 50B) of the support structure 14.

Although illustrated in FIG. 2, the blender hopper 22 (or other blender inlet) may be entirely separate from the support structure 14. As described above, the blender inlet may be part of a separate blender unit (e.g., 20 of FIG. 1). It may be desirable to position the support structure 14 and/or the blender unit relative to one another to bring the outlets 18 into the desired discharge positions within the blender inlet (e.g., hopper 22). To that end, the support structure 14 may include an opening 62 disposed therein for receiving or being positioned over the blender inlet. In some embodiments, a forklift or some other transportation unit may lift the portable support structure 14 and lower the support structure 14 directly over the blender unit so that the opening 62 is positioned over the blender inlet and the outlets 18 extend into the blender inlet. In addition to or in lieu of this placement of the support structure 14, the blender unit may be backed up relative to support structure 14 (which is already positioned on the ground) until the blender inlet (e.g., hopper 22) is received into the opening 62 and aligned with the outlets 18.

In some instances, the support structure 14 may be equipped with a set of outriggers 64 to increase the stability of the portable support structure 14. The outriggers 64 may help to keep the support structure 14 stable in the event of high winds or the support structure 14 being impacted by a container, forklift, blender, or other pieces of equipment at the job site. In addition, the outriggers 64 on the support structure 14 may be used for interfacing with the blender to bring the blender inlet into a desired position or alignment within the opening 62 of the support structure 14.

Figure 3:
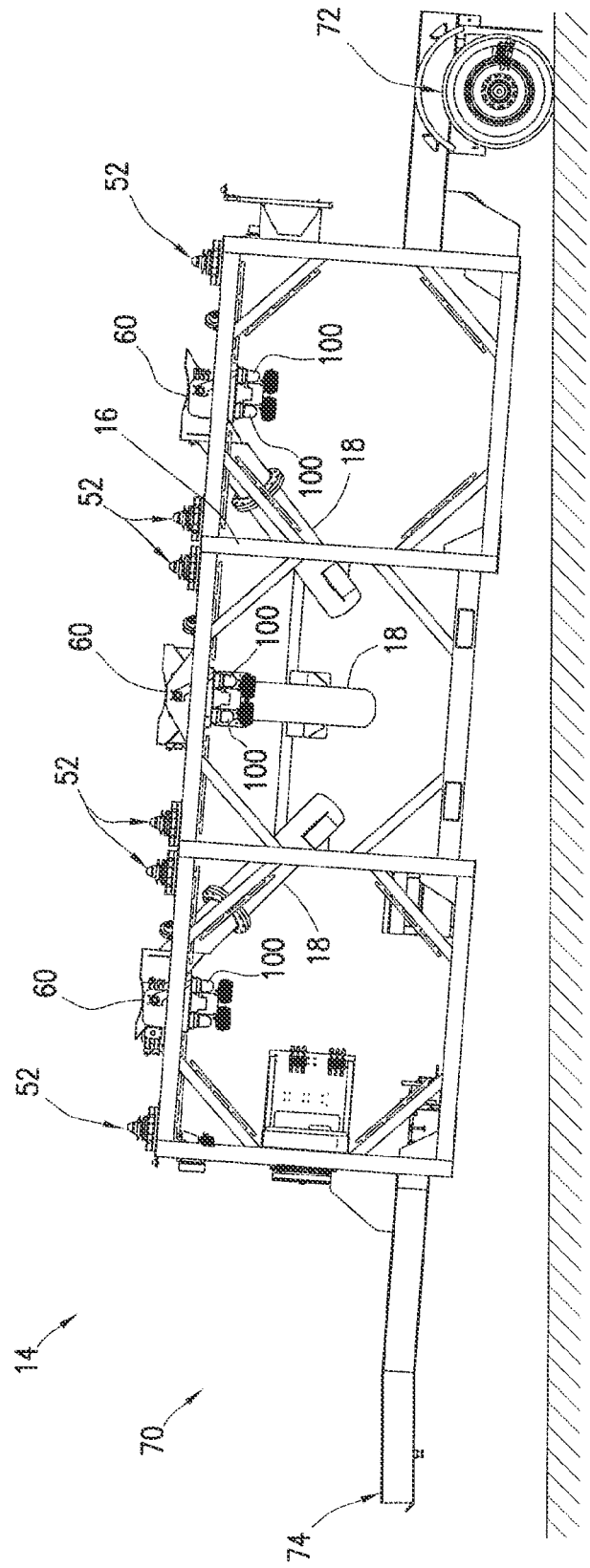
FIG. 3 is a side view of a portable support structure integrated with a trailer unit, in accordance with an embodiment of the present disclosure.

To further improve the mobility, transportability, and rig-up speed at the job site, the portable support structure 14 may be integrated into a specialized support structure trailer unit 70, as shown in FIG. 3. As illustrated, the support structure trailer unit 70 may include similar components as the above described support structure 14 (e.g., frame 16 and one or more gravity feed outlets 18). In addition, the support structure trailer unit 70 includes wheels 72 for enabling transportation of the support structure trailer unit 70 to and from a desired location (e.g., well site). In the illustrated embodiment, a front end 74 of the support structure trailer unit 70 may be designed to lift up and hook onto a trailer hitch of a transportation vehicle. Once the support structure trailer unit 70 is transported to the site, the front end 74 may be lifted off the transportation vehicle and the support structure trailer unit 70 may be lowered directly to the ground, without the use of a hoisting mechanism (e.g., forklift, crane, etc.). The support structure 14 may be integrated into other types of mobile trailer units as well.

Having the support structure 14 integrated into a separate mobile unit (70) may improve the reliability of the various components that make up the support structure 14 and increase the life of the unit. This is because every time the support structure 14 is lifted or moved via a hoisting mechanism, for example, the frame 16, electronics, controls, and/or outlets 18 can be negatively impacted. Shock from movement of the relatively large support structure about a site can lead to undesirable operations of the support structure components. With the support structure 14 integrated into the trailer unit 70, the shock due to loading/unloading the portable support structure 14 itself is minimized.

In some embodiments, the support structure trailer unit 70 may also include an air suspension system or other components to reduce shock on the support structure 14 during transportation of the trailer unit 70 (e.g., traveling along a road). The suspension system may help to further isolate the electronics and controls of the support structure from shock loading during transportation of the support structure trailer unit 70 along the road.

Figure 4:
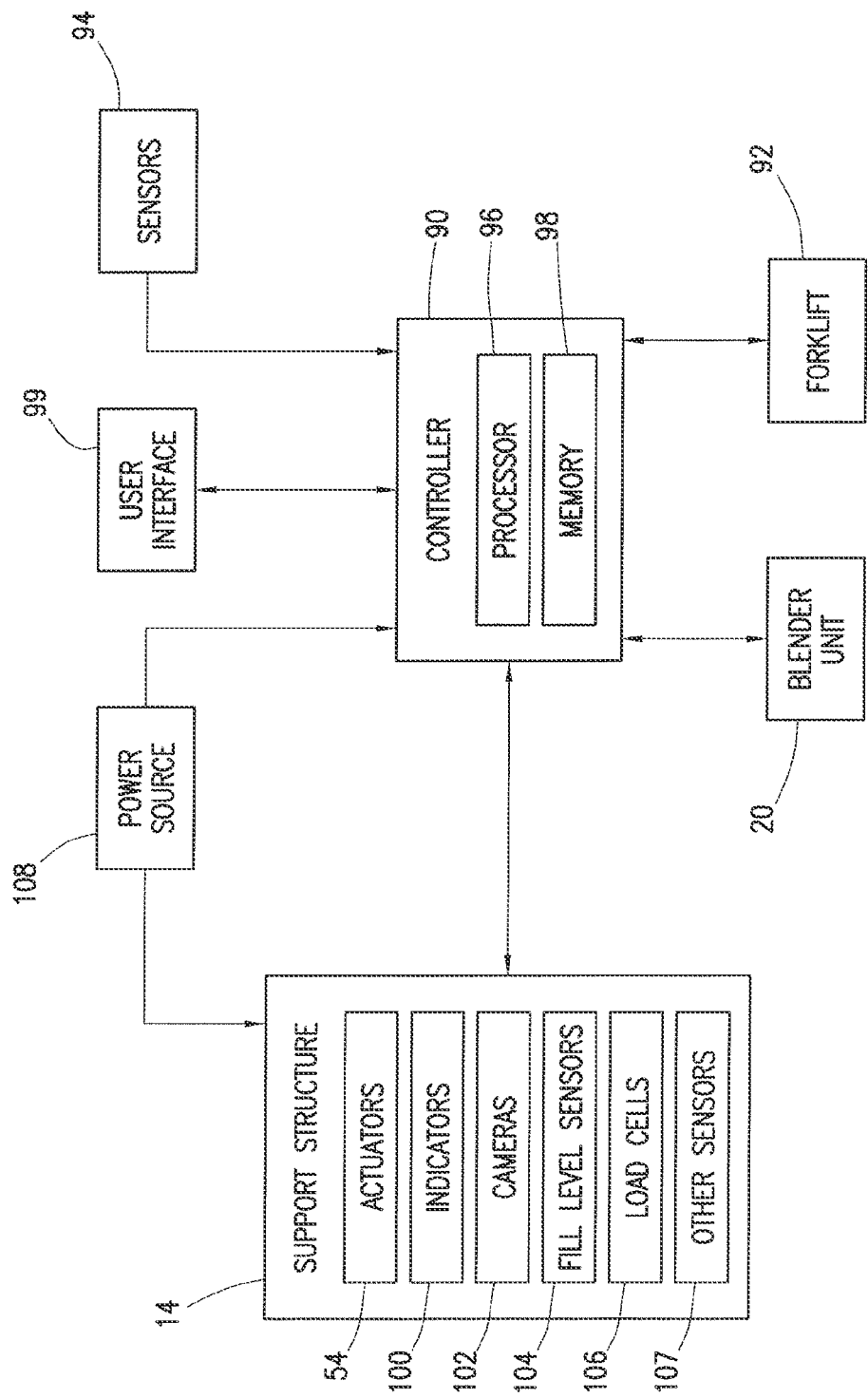
FIG. 4 is a schematic block diagram of an embodiment of a portable support structure with electronics that are communicatively coupled to a control system, in accordance with an embodiment of the present disclosure.

Having discussed the mechanical components that make up various embodiments of the portable support structure 14, a more detailed discussion of various electronics and controls that may be used within or communicatively coupled to the support structure 14 will be provided. FIG. 4 is a block diagram illustrating the various electronic and control components that may be used throughout a well site with the disclosed portable support structure 14.

The portable support structure 14 may include a number of electronic components, and these components may be communicatively coupled (e.g., via a wired connection or wirelessly) to one or more controllers 90 (e.g., automated control system) at the well site. The control system 90 may be communicatively coupled to several other well site components including, but not limited to, the blender unit 20, a hoisting mechanism (e.g., forklift) 92, and various sensors 94.

The control system 90 utilizes at least a processor component 96 and a memory component 98 to monitor and/or control various operations and bulk material inventory at the well site. For example, one or more processor components 96 may be designed to execute instructions encoded into the one or more memory components 98. Upon executing these instructions, the processors 96 may provide passive logging of certain operations at the well site, as well as the amount, type, and location of bulk materials at the well site. In some embodiments, the one or more processors 96 may execute instructions for controlling operations of certain well site components (e.g., support structure electronics, blender unit 20, hoisting mechanism 92, etc.). This may help to control transportation and placement of the support structure 14 relative to the blender inlet, as well as bulk material transfer at the well site. For example, the processors 96 may output signals at a user interface 99 for instructing operators to remove an empty container from the support structure 14 and replace the container with a new container holding a certain type of bulk material needed for the well treatment. Other types of instructions for inventory control/monitoring may be provided through the disclosed systems.

As shown, the support structure 14 itself may include a number of electronic components such as, for example, the automated actuators 54 described above with reference to FIG. 2. These actuators 54 may be controlled to open and/or close a discharge gate of one or more containers elevated on the support structure 14. The support structure 14 may also include one or more indicators 100 (e.g., indicator lights) disposed on the support structure for providing various information about the operating state of the support structure 14. For example, in the embodiment shown in FIG. 3, the support structure 14 may include at least one indicator 100 corresponding to each automated actuator 54 on the support structure 14. The indicators 100 may include lights designed to indicate whether the discharge gates of containers disposed on the support structure 14 are in an open position or in a closed position, based on the operating state of the corresponding actuators 54.

In addition, the support structure 14 may include various sensors designed to take measurements and provide sensor feedback to the control system 90. For example, the support structure 14 may include cameras 102 (e.g., all-weather cameras) to provide optical feedback of certain operations involving the support structure 14. One or more cameras 102 may be positioned to look out toward where the hoisting mechanism 92 is manipulated to engage the portable support structure 14 (e.g., proximate the slots 56 of FIG. 2). These cameras 102 may detect a proximity of the hoisting mechanism 92 to the support structure 14 as the hoisting mechanism is maneuvered toward and into engagement with the support structure 14. The controller 90 may output signals to control an alignment of the hoisting mechanism (e.g., forklift) 92 toward the slots or other interface feature on the support structure, based on the optical feedback received from the cameras 102. Once aligned and fully engaged with the support structure 14, the hoisting mechanism 92 may be used to lift and transport the support structure 14 about the well site, as described above.

Additional cameras 102 may be used to control a position of the blender unit 20 relative to the support structure 14 during set up of the system at a desired location. For example, the cameras 102 may detect a proximity of the blender inlet (e.g., hopper or mixing vessel) to the support structure 14 as the blender unit 20 is backing toward the support structure 14 (or as the support structure 14 is being lowered over the blender unit 20 via the hoisting mechanism 92). The controller may output signals to control an alignment and proximity of the blender unit 20 relative to the support structure 14, based on the optical feedback received from the cameras 102.

The support structure 14 may also include fill level sensors 104 (e.g., cameras, guided wave radar sensors, sonar sensors, array or level switches, or any other type of level sensing devices) pointed toward the blender hopper and used to detect a level of the bulk material present in the blender hopper. The controller 90 may output control signals to one or more actuators 54 on the support structure 14 to initiate filling of the blender hopper with additional bulk material from one or more containers on the support structure 14, based on the received fill level sensor signals. That is, when the blender hopper is running low, the controller 90 may actuate additional containers into the open position to maintain a steady flow of bulk material to the blender hopper.

The support structure 14 may also include load cells 106 for detecting the presence and/or weight of the one or more containers disposed on the frame of the support structure 14. By detecting the weight of the containers, the load cells 106 may provide the controller 90 with information regarding the number of containers disposed on the support structure 14 as well as the fill level of bulk material within the individual containers on the support structure 14.

Other sensors 107 may be present throughout the support structure 14. In some embodiments, for example, the support structure 14 may include additional sensors 107 for detecting the presence and/or location of one or more containers disposed atop the frame of the support structure 14. When fewer than the maximum capacity of containers are disposed on the support structure 14, the controller 90 may output a command for an operator or automated system to position a new filled container of bulk material onto the support structure 14, based on the received signal from the sensors 107.

The controller 90, the support structure electronics, or both, may utilize power from an external power source 108, as shown. In other embodiments, the support structure 14 may include its own power source 108 for operating the onboard electronics and sensors.

As mentioned above, the controller 90 may be communicatively coupled to various other sensors 94 disposed about the well site. In some embodiments, these sensors 94 may include one or more load cells or bin full switches for tracking a level of bulk material in a portable container and indicating whether the container is empty, full, or partially full. Such sensors 94 may be used for any given container, the blender hopper, a silo (not shown), or any other component at the well site. In addition, in some embodiments the sensors 94 may include RFID tags used to provide an indication of the particle size, bulk volume, weight, type, material, and/or supplier of the bulk material disposed in a certain container. In such instances, the controller 90 may be communicatively coupled to an RFID reader disposed in proximity to the containers being moved about the well site.

Although the present disclosure and its advantages have been described in detail, it should be understood that various changes, substitutions and alterations can be made herein without departing from the spirit and scope of the disclosure as defined by the following claims.

What is claimed is:

1. A portable support structure comprises:
a plurality of frames, each configured to support one of a plurality of portable containers for discharge of bulk material from the portable container into the corresponding frame, wherein one of the plurality of frames comprises an open space therein configured to receive a blender inlet of a blender; and
a gravity feed outlet for two or more of the plurality of frames, configured to direct bulk material from the corresponding frame directly to the blender inlet in the open space,
wherein each gravity feed outlet comprises an upper end disposed within the corresponding frame, and a lower end extending from the corresponding frame into the open space.

2. The support structure of claim 1, wherein each of the plurality of frames has an upper face configured to support one of the plurality of portable containers, and wherein the upper face for all of the plurality of frames is approximately the same size and shape.

3. The support structure of claim 1, wherein each gravity feed outlet is configured to direct bulk material from the corresponding portable container to the blender inlet in the open space without routing the bulk material onto a conveyor.

4. The support structure of claim 1, wherein the plurality of frames are fixedly joined together into a continuous whole.

5. The support structure of claim 1, wherein the open space is entirely disposed within one of the frames.

6. The support structure of claim 5, wherein the plurality of frames comprises one frame having the open space and two other frames, and wherein the gravity feed outlet for each of the two other frames is configured to discharge at an angle of inclination of approximately 25-55 degrees from horizontal from the corresponding other frame into the open space.

7. A portable support structure comprises:
a plurality of beams joined to form a continuous, elongated rectangular body having three or more cubic or rectangular shaped supports coupled end to end, wherein each cubic or rectangular shaped support is configured to support one of a plurality of portable containers, and wherein one of the cubic or rectangular shaped supports comprises an open space therein configured to receive a blender inlet of a blender; and
a gravity feed outlet for two of the cubic or rectangular shaped supports, configured to direct bulk material from the corresponding portable container supported thereon to the blender inlet in the open space,
wherein each gravity feed outlet comprises an upper end disposed within the corresponding support, and a lower end extending from the corresponding support into the open space.

8. The support structure of claim 7, wherein the three or more cubic or rectangular shaped supports comprises a central cubic or rectangular shaped support, and wherein the central cubic or rectangular shaped support has the open space disposed therein.

9. The support structure of claim 7, further comprising a plurality of outrigger supports configured to stabilize the portable support structure, wherein the plurality of outrigger supports are configured to extend from only one side of the portable support structure.

10. A portable support structure comprises:
a frame comprising a plurality of support bodies each configured to support one of a plurality of portable containers, wherein the frame comprises an open space therein configured to receive a blender inlet of a blender; and
a gravity feed outlet for at least two of the plurality of support bodies, configured to direct bulk material from the corresponding portable container supported thereon directly to the blender inlet in the open space,
wherein each gravity feed outlet comprises an upper end disposed within the corresponding support body beneath a discharge gate of the corresponding portable container, and a lower end disposed fully within the open space.

11. The support structure of claim 10, wherein the gravity feed outlet for at least two of the plurality of support bodies comprises a gravity feed outlet for each of the plurality of support bodies.

12. The support structure of claim 10, wherein the plurality of support bodies are coupled together to form a continuous, elongated rectangular body.

13. The support structure of claim 12, wherein the plurality of support bodies comprises three or more cubic or rectangular shaped supports.

14. The support structure of claim 10, wherein each of the plurality of support bodies comprises an upper face configured to support one of the plurality of portable containers, and wherein the upper face for all of the support bodies are approximately identical in shape and size.

15. The support structure of claim 10, wherein the plurality of support bodies comprises three support bodies.

16. The support structure of claim 15, wherein a central one of the three support bodies comprises the open space.

17. The support structure of claim 10, wherein each of the plurality of support bodies comprises a plurality of beams forming a cubic or rectangular shaped support.

18. The support structure of claim 10, wherein each gravity feed outlet is configured to direct bulk material from the corresponding portable container to the blender inlet in the open space without routing the bulk material onto a conveyor.

19. The support structure of claim 10, wherein the open space is disposed entirely within one of the plurality of support bodies of the frame.

20. The support structure of claim 19, wherein the plurality of support bodies are coupled together end-to-end to form a continuous, elongated rectangular body of the frame.

21. The support structure of claim 19, wherein the plurality of support bodies comprise one support body having the open space and two adjacent support bodies, wherein the gravity feed outlet for the support body having the open space is configured to discharge downward into the open space, and wherein the gravity feed outlet for each of the two adjacent support bodies is configured to discharge at an angle of inclination from the corresponding adjacent support body into the open space.

22. The support structure of claim 10, wherein each gravity feed outlet comprises the upper end disposed within the corresponding support body, and the lower end extending from the corresponding support body into the open space.

* * * * *